United States Patent
Lomax, Jr. et al.

(10) Patent No.: US 6,918,953 B2
(45) Date of Patent: Jul. 19, 2005

(54) MODULAR PRESSURE SWING ADSORPTION PROCESS AND APPARATUS

(75) Inventors: Franklin D. Lomax, Jr., Arlington, VA (US); Troy Hickman, Washington, DC (US); John S. Lettow, Washington, DC (US); Michael Streeks, Alexandria, VA (US); Vinay Prasad, Alexandria, VA (US)

(73) Assignee: H2Gen Innovations, Inc., Alexandria, VA (US)

( * ) Notice: Subject to any disclaimer, the term of this patent is extended or adjusted under 35 U.S.C. 154(b) by 30 days.

(21) Appl. No.: 10/615,244

(22) Filed: Jul. 9, 2003

(65) Prior Publication Data

US 2005/0005771 A1 Jan. 13, 2005

(51) Int. Cl.[7] .............................................. B01D 53/053
(52) U.S. Cl. .............................. 96/130; 95/96; 96/135; 96/137; 96/142; 96/149; 96/153
(58) Field of Search ........................ 95/96–106; 96/121, 96/122, 130, 149, 133–137, 142–144, 153, 154

(56) References Cited

U.S. PATENT DOCUMENTS

| | | | | |
|---|---|---|---|---|
| 3,006,438 A | * | 10/1961 | De Yarmett | 95/120 |
| 3,323,292 A | * | 6/1967 | Brown | 96/110 |
| 3,986,849 A | | 10/1976 | Fuderer et al. | |
| 4,062,777 A | * | 12/1977 | Tsuruta et al. | 210/264 |
| 4,234,322 A | | 11/1980 | De Meyer et al. | |
| 4,373,938 A | * | 2/1983 | McCombs | 96/114 |
| 4,402,712 A | * | 9/1983 | Benkmann | 95/98 |
| 4,475,929 A | * | 10/1984 | Fuderer | 95/97 |
| 4,509,959 A | * | 4/1985 | McCombs | 96/115 |
| 4,519,813 A | * | 5/1985 | Hagiwara et al. | 95/101 |
| 4,543,109 A | * | 9/1985 | Hamlin et al. | 95/98 |
| 4,802,899 A | * | 2/1989 | Vrana et al. | 96/109 |
| 5,112,367 A | | 5/1992 | Hill | |
| 5,133,784 A | * | 7/1992 | Boudet et al. | 95/100 |
| 5,268,021 A | | 12/1993 | Hill et al. | |
| 5,366,541 A | | 11/1994 | Hill et al. | |
| 5,656,068 A | * | 8/1997 | Smolarek et al. | 95/101 |
| 5,779,771 A | * | 7/1998 | Wooten et al. | 96/124 |
| 5,997,612 A | * | 12/1999 | Doong | 95/101 |
| 5,997,617 A | * | 12/1999 | Czabala et al. | 96/130 |
| 6,036,754 A | * | 3/2000 | Rowe | 96/130 |
| 6,051,050 A | | 4/2000 | Keefer et al. | |
| 6,364,937 B1 | * | 4/2002 | McMahon | 95/118 |
| 6,699,307 B1 | * | 3/2004 | Lomax, Jr. | 95/97 |
| 6,755,895 B2 | * | 6/2004 | Lomax et al. | 95/97 |

* cited by examiner

Primary Examiner—Robert H. Spitzer
(74) Attorney, Agent, or Firm—Oblon, Spivak, McClelland, Maier & Neustadt, P.C.

(57) ABSTRACT

A pressure swing adsorption (PSA) system including a first group of PSA modules having a plurality of first PSA modules, and a second group of PSA modules having a plurality of second PSA modules. The system includes a feed gas manifold, a product manifold, and a waste manifold connected to the first PSA modules and the second PSA modules. Each first PSA module operates on a first PSA cycle in synchronization with the other first PSA modules, and each second PSA module operates on a second PSA cycle in synchronization with the other second PSA modules. The first PSA cycle is offset from the second PSA cycle. The PSA modules include a plurality of pressurized adsorbent chambers, an inlet manifold, and an outlet manifold. A rigid structure is provided that connects the inlet manifold to the outlet manifold, and structurally joins the inlet and outlet manifolds to the adsorbent chambers.

25 Claims, 6 Drawing Sheets

MODULAR PRESSURE SWING ADSORPTION PROCESS AND APPARATUS

BACKGROUND OF THE INVENTION

1. Field of the Invention

The present invention relates to pressure swing adsorption (PSA) processes. PSA is a commonly used process for the purification of gases. Exemplary applications include separation of hydrogen from gas mixtures, separation of helium from natural gas, purification of landfill gas, and air separation for production of oxygen, nitrogen and/or argon.

2. Discussion of the Background

Many PSA systems are limited by their very large product and raffinate gas flow fluctuations. These fluctuations require sizeable storage or surge tanks to dampen the flow fluctuation adequately to allow proper function of downstream process equipment connected to the PSA system.

Industrial-scale gas separations have traditionally been executed using PSA cycles possessing at least one pressure-equalizing step to enhance pressurized product fractional recovery at a given purity. In PSA cycles, increased fractional recovery decreases the amount of gas rejected to the raffinate surge tank, and ensures a more nearly continuous flow of pressurized product gas. Cycles having three or more equalizations are known. Another step taken to reduce flow pulsation in the art is to operate cycles having many equalizations and many vessels in a single process train. An example of a PSA system having many vessels and many equalization steps is U.S. Pat. No. 3,986,849 to Fuderer, et al., which describes process trains possessing as many as ten adsorbent vessels and fifty-five valves. In industrial applications, the high energy and operating costs associated with loss of recoverable product has usually outweighed the considerable increase in complexity associated with more complex PSA cycles having one or more pressure equalizations, except for very large plants. Thus, most plants employ extremely large surge tanks for both pressurized product and raffinate gas.

PSA systems of all types, but especially those having multiple equalizations, are also subject to severe limitations due to their very high complexity and attendant high parts count. Not only does this complexity significantly increase the probability of a component failure, it also significantly increases the system size, assembly time, and material cost. Most PSA systems are single point of failure systems, with notable exceptions being the processes revealed in U.S. Pat. No. 4,234,322 to De Meyer et al. and U.S. application Ser. No. 10/269,064. Even in the exemplary processes, the PSA plant must eventually be shut-down to conduct maintenance on the defective component. Such shutdowns are extremely undesirable as they incur a significant amount of lost production time for the entire process facility. Further, when the PSA is connected to a high temperature process such as a hydrocarbon steam reformer, autothermal reformer, partial oxidation reformer, ammonia synthesis plant or ethylene cracker, the lifetime of the connected process equipment may be greatly reduced due to the high mechanical stresses incurred during a shutdown and restart event.

U.S. Pat. No. 6,051,050 to Keefer et al. describes systems using multiple rotary PSA modules in parallel in order to achieve greater overall system capacity, but fails to disclose a method or strategy for operating these modules in the event of a malfunction. The rotary modules of the Keefer et al. patent are quite different than those accepted in industrial practice, and are not subject to the same type of single point valve failure as valved PSA apparatuses. Their mode of failure is through gradual seal failure. The modules of the Keefer et al. patent also have a very large number of active beds, and they are thus less concerned with variations in product and raffinate gas flowrate pulsation. The low-pulsation rotary modules of the Keefer et al. patent and the similar inventions described in U.S. Pat. No. 5,112,367, U.S. Pat. No. 5,268,021, and U.S. Pat. No. 5,366,541 suffer from inevitable leakage due to their use of sliding seals. This leakage results in reduced purity and product recovery, as well as maintenance problems due to limited seal lifetime. High pressure exacerbates these problems, making rotary modules less desirable for industrially-important separations than typical valved PSA apparatuses.

Because of the extremely large size of typical valved PSA systems and their very high cost it has remained extremely undesirable to provide backup PSA capacity to prevent process shutdowns, especially for valved PSA systems having pressure equalizations and large numbers of adsorbent beds, with their attendant high complexity.

The inventors hereby incorporate by reference in their entirety an improved apparatus for advanced PSA systems that greatly reduces the complexity of the PSA apparatus employing pressure equalizations set forth in U.S. application Ser. No. 10/269,067, and methods for executing PSA cycles that dramatically reduce the number of valves required to execute PSA cycles set forth in U.S. application Ser. No. 10/269,064.

SUMMARY OF THE INVENTION

Accordingly, the present invention advantageously provides a valved pressure swing adsorption system with reduced flow pulsations.

The pressure swing adsorption system of the present invention can be repaired while operating.

The present invention further advantageously provides a pressure swing adsorption system with increased reliability.

The present invention provides an apparatus for pressure swing adsorption systems that eliminates bending moments at the adsorbent vessel end connections.

The present invention also advantageously provides a pressure swing adsorption apparatus with an integral structural cover.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 1:
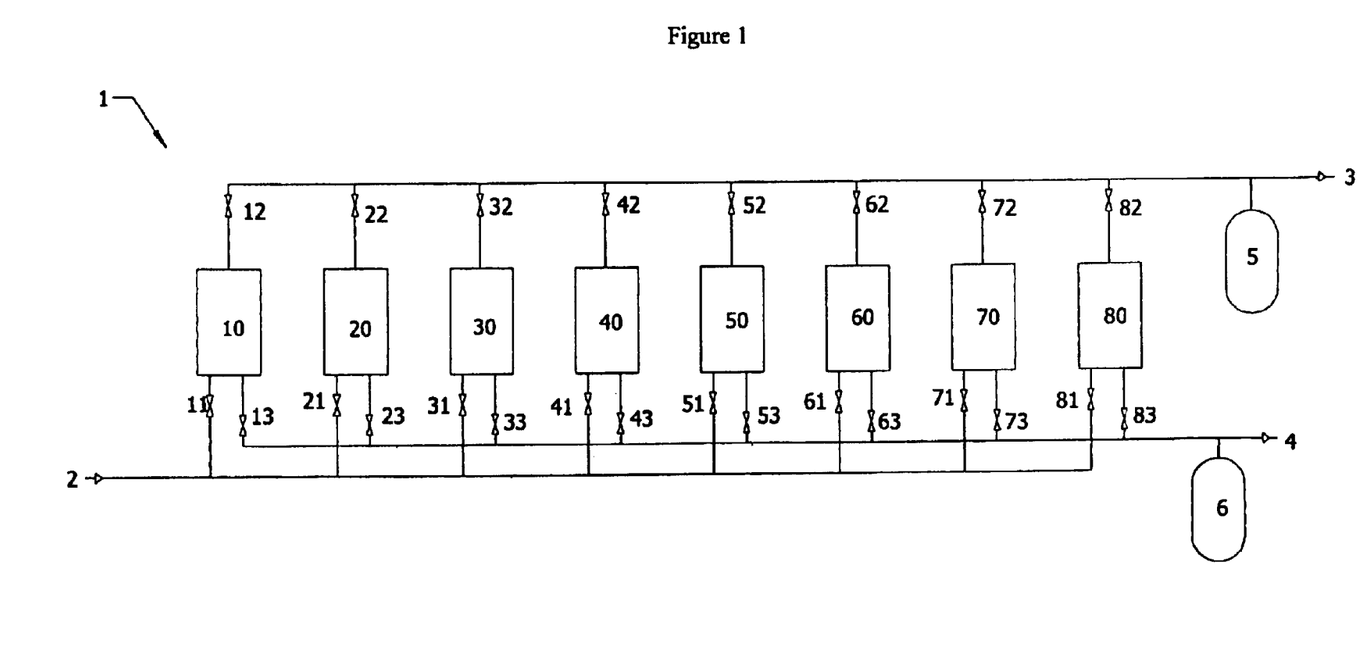
FIG. 1 is a flow schematic of a PSA system of the present invention.

FIG. 1 is a flow schematic for a PSA system 1 of the present invention having a pressurized feed gas manifold 2, a pressurized product manifold 3, and a low-pressure raffinate manifold 4. Product manifold 3 is provided with a product surge tank 5 while raffinate manifold 4 is provided with raffinate surge tank 6. In the process of the present invention, at least a first PSA module 10 and a second PSA module 20 are connected to the feed, product and raffinate manifolds. In the embodiment of FIG. 1, eight PSA modules 10, 20, 30, 40, 50, 60, 70 and 80 are operated in parallel. Any number of parallel modules may be employed in the process of the present invention, and the choice of eight modules is adopted only as an example.

The PSA modules are connected to the feed manifold 2 by their respective isolation valves 11, 21, 31, 41, 51, 61, 71, and 81. The PSA modules are connected to the product manifold 3 by their respective isolation valves 12, 22, 32, 42, 52, 62, 72, and 82. The PSA modules are connected to the raffinate manifold 4 by their respective valves 13, 23, 33, 43, 53, 63, 73, and 83. When all of these valves are in their open positions, every PSA module is fluidly connected in parallel. Individual PSA modules may be isolated from the fluid manifolds by closing the valves connecting that module to the manifolds. For instance, module 20 may be isolated by closing valves 21, 22 and 23. Once a module is isolated, it is possible to conduct maintenance on that module while the rest of the installed modules are still in production. If module 20 was found to have a defective or malfunctioning component, it could be isolated from the PSA process manifolds 2, 3 and 4 by closing the valves 21, 22 and 23, and then maintenance can be carried out. PSA modules 10, 30, 40, 50, 60, 70 and 80 would continue to operate as usual. The maximum system capacity would be ⅞ths of the original capacity. This slight reduction in overall capacity may be addressed by operating the remaining PSA modules at a higher operating cycle frequency, or may be managed by designing additional capacity into the overall system such that no significant performance degradation is experienced when running at slightly elevated flowrate conditions.

Figure 2:
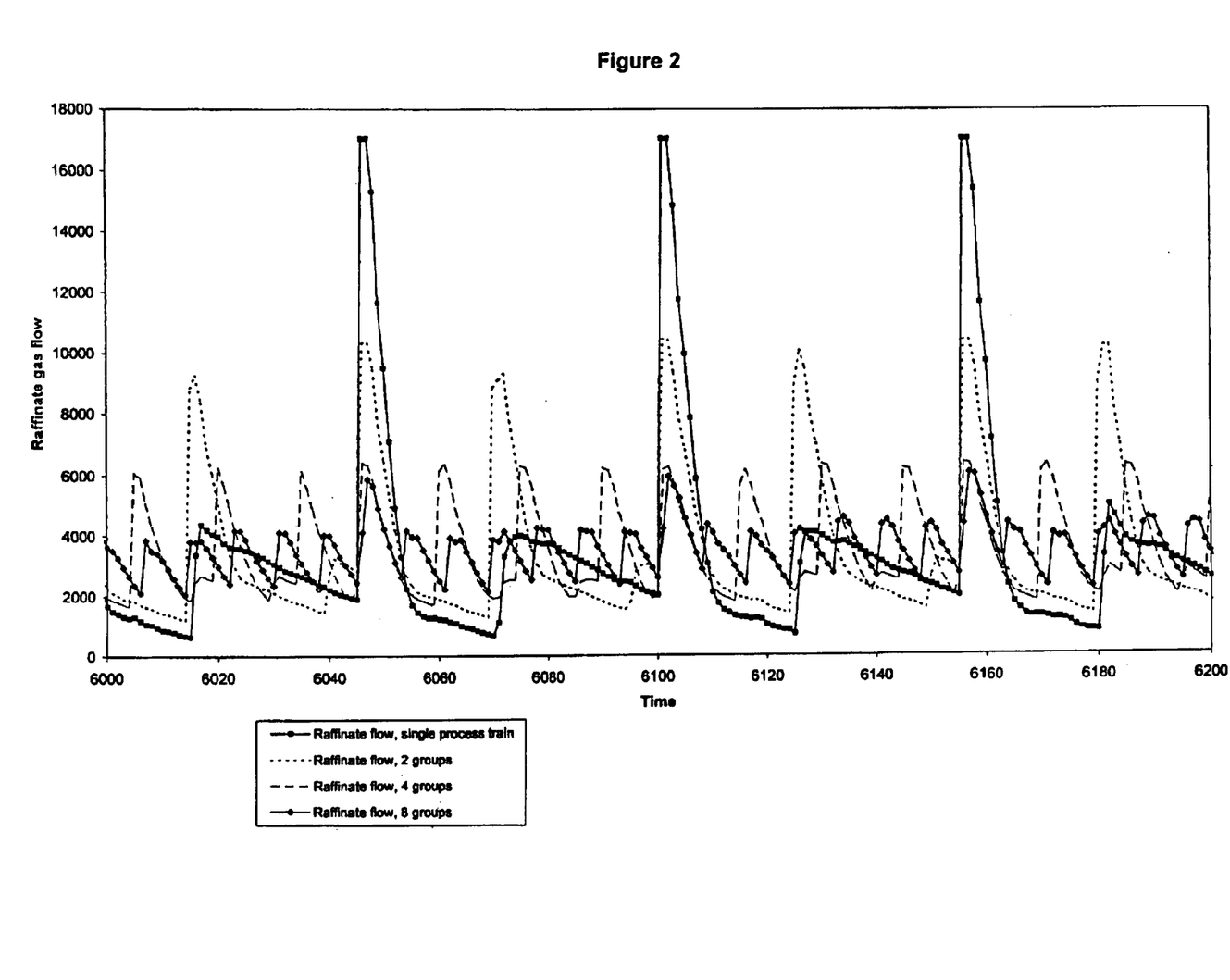
FIG. 2 is a graph showing the reduction in flow pulsation achieved with the PSA system of the present invention.

FIG. 2 illustrates another advantage of the PSA process of the present invention. FIG. 2 is a graph showing low-pressure raffinate flowrate versus time for four different operating strategies for the PSA system 1 of FIG. 1. These traces are for a three-equalization, seven bed PSA after the process of U.S. application Ser. No. 10/269,064, but the effect is similar for any PSA cycle. PSA cycles using less than three equalizations would show even more pronounced pulsation in the raffinate flowrate.

If the PSA system is operated with every module synchronized to run their individual PSA cycles in phase, the flow pulsations are the same as operating a single process train, and the total flowrate varies between less than 1,000 units and over 17,000 units, a factor of 17:1. In the process of the present invention, the array of PSA modules is operated out of phase, such that periods of raffinate gas generation are offset from one another. In a first embodiment of the present invention, the eight modules of the PSA system are operated in two groups of four, with each group operated 180 degrees out of phase with one another. FIG. 2 shows that this results in the raffinate flowrate varying between roughly 1,500 and 9,000 units. This is a ratio of about 6:1, which is nearly three times less than was the case with the prior art method of operating a single process train, or operating many modules both in parallel and in phase. In this first embodiment, each group uses half of the total available modules. For the example of an eight module system, this results in four groups of modules. If one module fails and must be isolated for repair, the system retains ⅞ths capacity, but the raffinate flowrate waveform would change due to the asymmetric nature of the two groups of vessels. The flowrate through the remaining three vessels in the group would be increased as much as 33% during some process steps, a factor which must be considered to prevent fluidization of the adsorbents and/or fluid shocks in the piping and/or valving systems.

In alternative configuration of the present invention, the modules are separated into four groups and are each operated 90 degrees out of phase. FIG. 2 shows that the resulting raffinate flowrate varies between about 2,000 and 6,000, a ratio of about 3:1. This is roughly half the flowrate variation experienced in the first embodiment where two groups of modules operate 180 degrees out of phase, and one sixth the variation of the prior art methods. Although this flowrate variation reduction is impressive, it reduces the number of modules per group to two for the example of an eight module system. If one module must be repaired, the change in flowrate for the other module in the group would be 100% during some cycle steps, a factor to be considered in designing the vessels and their interconnecting valves and flow conduits.

In a further alternative configuration of the present invention, eight groups of modules are employed with their cycles offset by 45 degrees. This yields only a modest decrease in flowrate pulsation compared to four groups, and results in even larger changes in flowrate should a module require repair. In the example of the eight module system, each module would operate independently, for instance.

Although even-numbered groups were described above and shown in FIG. 2, odd numbers of groups are also feasible. In fact, any number of groups is feasible. Further, any number of modules can also be used to yield any number of modules per group. The embodiments discussed above assume that the groups operate 180, 90 and 45 degrees out of phase. For a given PSA cycle for each module, different phasing may be desirable to minimize flow variations of the product, the raffinate or both.

It is preferable that each group have the same number of vessels in order to minimize flow variations for the entire system as well as flowrate variations through any given module in order to avoid the problems of adsorbent fluidization and fluid shocks. The balance between the number of groups and the number of modules per group must be optimized for each application of the present invention. In an application where minimized downtime for the connected equipment is the highest priority, a system with fewer groups each having a greater number of modules in parallel is preferred. In a system where reliability is of less importance than flowrate pulsation, a greater number of groups with fewer modules will be desired.

Figure 3A:
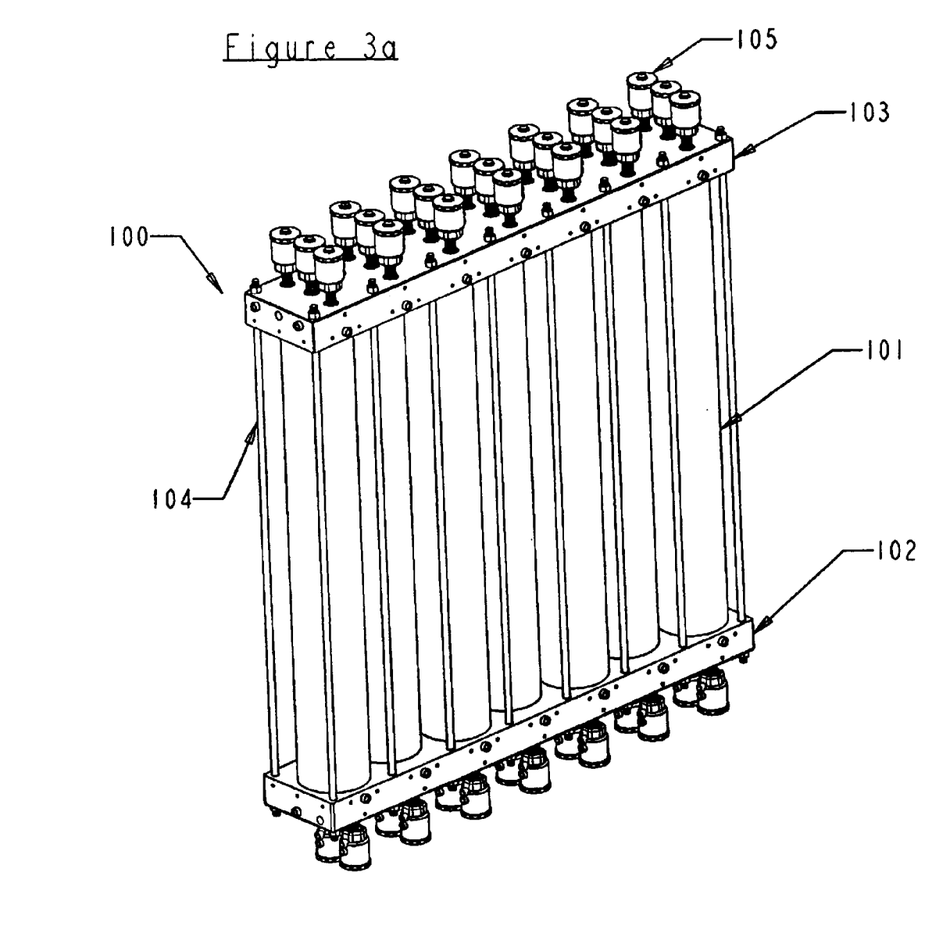
FIG. 3a shows a perspective view of a first embodiment of the PSA apparatus of the present invention.

FIG. 3a illustrates a preferred apparatus for the PSA module of the present invention. The PSA module 100 has seven adsorbent chambers 101 arrayed between a feed manifold 102 and a product manifold 103. The pressurized adsorbent chambers are held in a fixed relationship with the manifolds via tie bolts 104. Both the feed and product manifolds are provided with a plurality of valves 105, which are used to execute the PSA cycle.

The PSA module 100 illustrated in FIG. 3a is an especially-preferred embodiment for executing the seven adsorbent vessel, three pressure equalization cycle described in U.S. application Ser. No. 10/269,064. The apparatus of the present invention may also preferably be used to execute other cycles disclosed therein, as well as other PSA cycles of the related art.

Figure 3B:
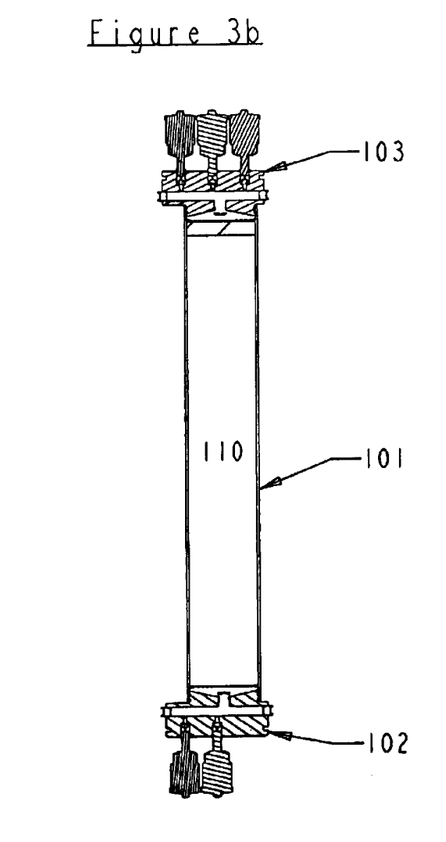
FIG. 3b shows a side section view through one adsorbent chamber of the first embodiment of the PSA apparatus of the present invention.

Side section view 3b shows a single adsorbent chamber 101 provided with an adsorbent mass 110. The adsorbent mass may be a single type of adsorbent, or may be made up of mixtures of adsorbent or distinct layers of adsorbent. The choice of adsorbent mass composition and size is dictated by the process flow conditions, the separation of interest and the PSA cycle, and does not limit the present invention in any way. The adsorbent chamber is sealingly connected to the inlet manifold 102 and the outlet manifold 103.

Figure 4:
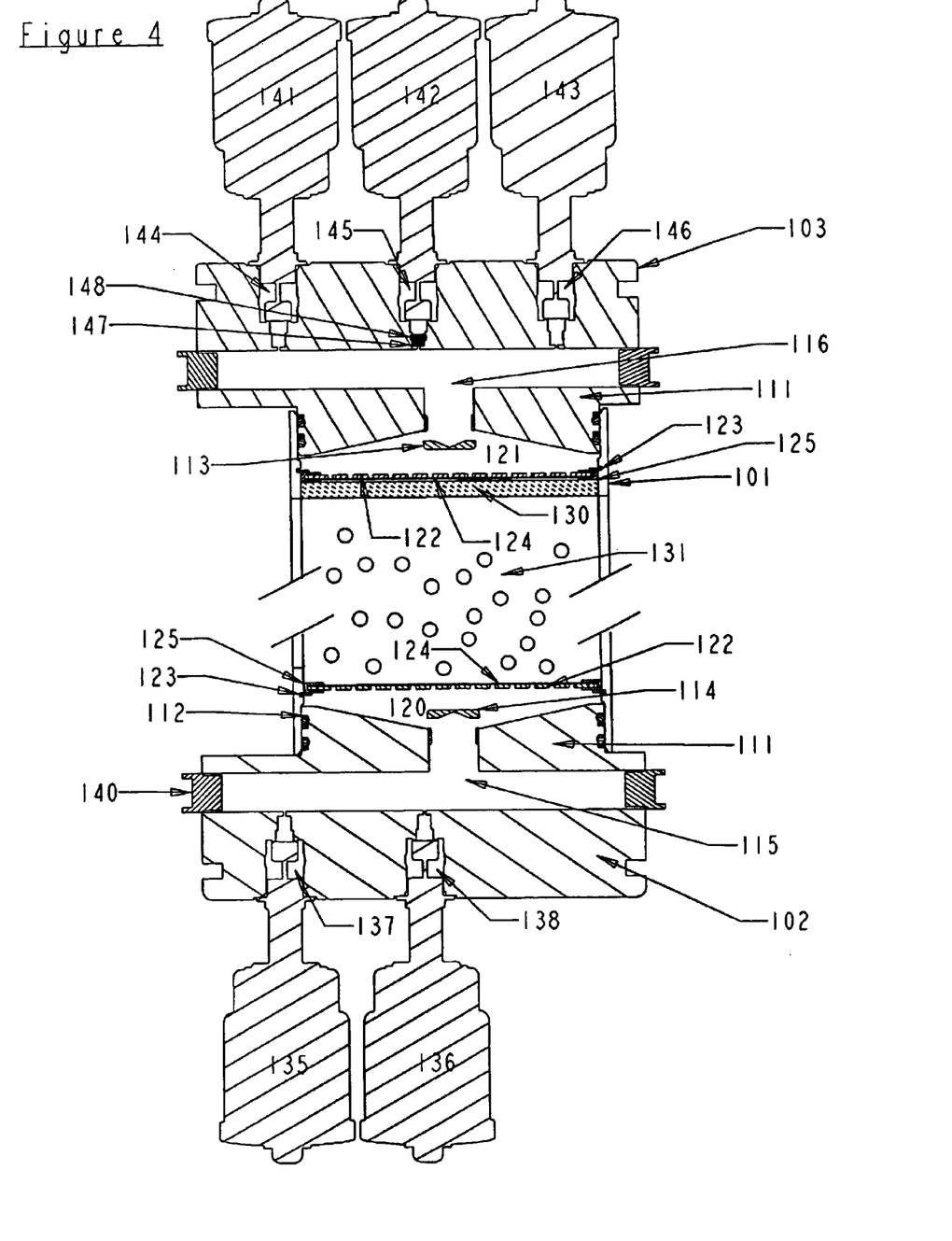
FIG. 4 shows a section view of the flow manifolds of the first embodiment of the PSA apparatus of the present invention.

FIG. 4 shows an exploded section view of the adsorbent chamber and manifolds of FIG. 3b. The adsorbent chamber 101 is advantageously mated to a sealing boss 111 provided on both the inlet and outlet manifolds. These are shown as identical features in the figure, but may be differently shaped if desired. Each sealing boss is provided with at least one sealing member 112 which affects the fluid seal between the adsorbent chamber and the manifold. Although preferred internal radial sealing features are shown in FIG. 4, compression seals or external radial seals may be provided. Neither the seals, nor the sealing boss affects a rigid structural joint between the manifolds and the adsorbent chamber.

In PSA adsorbent chambers of the related art, the adsorbent chamber is fixed in rigid structural relation to an end flange feature or manifold. Such rigid connections undesirably give rise to localized bending stresses. Due to the cyclic nature of the stress state in a PSA apparatus, this bending moment can undesirably give rise to substantial problems with premature fatigue failure of the apparatus. Such premature failure is especially dramatically accelerated in the case of hydrogen PSA, as hydrogen embrittlement can affect many metallic construction materials. Thus, the non-structural sealing feature of the present invention is especially desirable as it facilitates the use of far thinner structural elements for equivalent fatigue life. Further, since the structural connection between the manifolds which resists the pressure forces is not in contact with the fluid being purified, high-strength materials which are otherwise particularly susceptible to hydrogen embrittlement may be used. For instance, hardened steel may be used for the tie bolts 104, a material unacceptable in related art construction for hydrogen systems.

Another advantage of the sealing apparatus of the present invention is that different materials may be used to manufacture the adsorbent chamber, manifolds and tie bolt features. Thus, a material that has good strength but little stiffness could be used for the adsorbent chambers, such as fiberglass-reinforced plastic, while a stiff material with less strength may be used for the manifolds, such as aluminum or closed-cell polymer foam. Finally, a third material can be used for the tie bolts. This freedom to optimize each material individually facilitates potentially dramatic decreases in weight and/or materials cost when required for a particular application.

FIG. 4 shows that the sealing bosses 111 are provided with a concave internal form to aid in flow distribution from the outlet and inlet radial flow distributors 113 and 114. These may be a separate component as shown in FIG. 4, or may be formed integrally with the manifold. The radial flow distributor is in fluid communication with a fluid channel 115 in the inlet manifold and fluid channel 116 in the outlet manifold. Flowing fluid from the channel 115 through the flow distributor 114 communicates with a chamber 120, and a chamber 121 communicates with the channel 116 through flow distributor 113. The chamber is defined by the concave feature of the sealing boss as well as the adsorbent retainer plate 122, which is supported by a snap ring 123. The PSA apparatus of FIGS. 3 and 4 is shown for the case with the inlet manifold on the bottom of the apparatus and the outlet manifold on the top. If the apparatus is mounted in the opposite direction, the snap ring 123 would be on the other side of the retainer plate.

The retainer plate 122 may advantageously be supplied with a fine mesh layer 124 to retain small diameter adsorbent particles. This mesh layer may be made from wire mesh, woven or non-woven polymer, glass or other fabric. The mesh layer 124 and the retainer plate 122 are preferably assembled with a radial seal ring 125 which holds them together for assembly and provides a radial seal to prevent bypassing of fluid or particles. Although this composite retainer assembly is preferred, other adsorbent support means may be used with equal success, such as metal, polymer or ceramic foams with an open structure, nonwoven mats, or other means apparent to one skilled in the art.

The outlet manifold is preferably supplied with a similar retainer plate assembly, except that the snap ring 123 is positioned to hold the retainer plate from above. It is most preferable to supply an elastic layer 130 between the upper retainer plate and the adsorbent. This elastic layer is then held in compression by the outlet end retainer plate assembly, and exerts a compressive load on the adsorbent mass 131. Preferred elastic materials also serve a filtration function to exclude fluidized dust particles from entering the manifolds. Examples of preferred materials are reticulated polymer foam, woven or non-woven elastomer mat, or elastomer-impregnated mat such as those made from natural fibers such as coconut fiber. If desired, an elastic element may also be provided at the inlet, or bottom end of the adsorbent chamber.

The inlet manifold 102 is provided with a feed valve 135 and a waste valve 136. These valves mate with valve seats formed into the manifold. Inlet valve 135 communicates between parallel feed flow channel 137 and adsorbent chamber 101 through the channel 115 and the radial flow distributor 114. Feed flow channel 137 communicates with all of the adsorbent chambers in the apparatus through their respective valves. It may be appreciated from FIG. 4, which shows the valve 135 in its closed position, that flow through feed channel 137 between adsorbent chambers in the apparatus is not materially-impeded by the valve 135, whether it is in the open or closed position. This feature may be ensured by providing a flow channel 137 of sufficient cross-sectional area to ensure the ready flow through the channel, which is critical to the implementation of the PSA cycles of U.S. application Ser. No. 10/269,064. The waste valve 136 likewise communicates with a parallel waste flow channel 138, which is in fluid communication with all of the adsorbent chambers 101 of the apparatus through their respective valves. The figures show a manifold that is machined, and the channel features 115 are formed by drilling. Thus, plugs 140 are provided to seal the ends of the channel 115. If the manifold is formed by a net shape process such as casting, plugs 140 are not required. Likewise, the pugs could be replaced with sensors, safety relief valves or other appurtenances. Further, the flow channels 115 and/or 137 can be provided with additional features to provide connections for sensors, sample withdrawal, etc. The provision of such additional features does not limit the present invention in any way.

The outlet manifold 103 is similarly provided with product valve 141, equalization valve 142 and equalization valve 143. These valves communicate with product conduit 144, first equalization conduit 145 and second equalization conduit 146. Each of these conduits is in fluid connection with each of the adsorbent chambers of the PSA apparatus through the respective valves for each chamber. The apparatus shown is for the especially-preferred PSA cycle with seven adsorbent vessels and three pressure equalizations of U.S. application Ser. No. 10/269,064 by the present inventor. Other PSA cycles would use different numbers of valves and conduits. For instance, the six or five adsorbent chamber cycles of the above-named application would omit one of the equalization conduits and valves depicted in the figures for each adsorbent chamber.

The equalization conduit 145 is additionally provided with porous flow restriction element 147 which is retained by retaining ring 148. Alternatively, the retaining ring may be used to secure a flow control orifice plate. Other elements such as check valves or flow control valves may also be provided. Such features may be provided only for one parallel flow channel as shown here, or for more than one channel.

The apparatus depicted here uses preferred piston valves as described in U.S. application Ser. No. 10/269,067 with air actuation. Alternatively, the valves may be solenoid operated, hydraulically-operated or mechanically-operated via a mechanical drive system such as a camshaft. The choice of valve actuation does not limit the present invention, and does not detract from the advantages thereof. Further, the apparatus depicted uses all valves of a single size. Valves of varying sizes and types may be advantageously combined in the present apparatus to achieve desired combination of flow properties. Further, although the most-preferred apparatus employing parallel flow conduits is depicted, traditional PSA cycle not employing parallel flow conduits may also be executed by providing the required internal flow features.

The manifolds of the present invention may be made by machining from solid stock, or by machining from a near net shape part made by casting or by joining together layers of material by brazing, soldering or adhesive bonding. Further, the manifolds may be made as a monolithic assembly, or be fashioned in a number of pieces held together by fasteners or other means and sealed by means of fluid seals such as gaskets. The choice of manufacturing technique does not limit the advantages of the present invention.

Figure 5A:
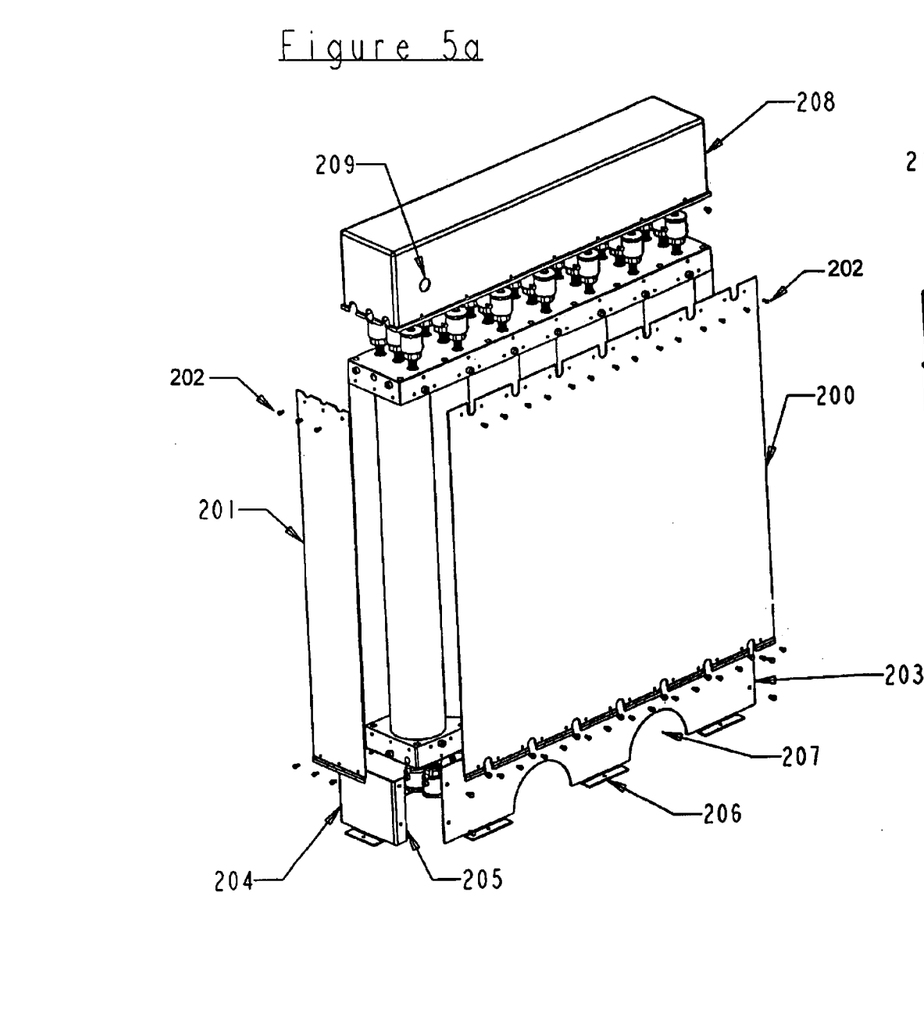
FIG. 5a shows an exploded view of a second embodiment of the PSA apparatus of the present invention.

FIG. 5a shows a second embodiment of the PSA apparatus of the present invention. The tie rods of the first embodiment are omitted, and are replaced by structural panels 200 and 201. These panels are secured to the manifolds 102 and 103 by fasteners 202. An example of a preferred fastener being a machine screw, although other types of fasteners may be employed. Alternatively, the joining means between the structural panels and the manifolds may be via an adhesive bond, brazing, soldering or welding. Indeed, any load-bearing connection joining the manifolds to the structural panels may be advantageously used. This connection allows the pressure load separating the two manifolds to be borne by the structural panels in a state of substantially-pure tensile stress. Design of a flat panel in tension is straightforward, and common construction materials such as metallic or polymer sheet excel in bearing tensile load. The use of structural panels advantageously distributes the pressure load along the boundary of the manifolds, thus mitigating the local stresses engendered by the tie bolts 104 of the first embodiment.

FIG. 5a also shows similar panels 203 and 204 which serve as structural supports for the module. Again, these are advantageously mechanically-attached to the manifold using means that are adequate to support the mechanical loadings imposed by the module weight, as well as any additional loads posed by wind, seismic action, shipping loads, service loads, etc. Such structural panels may advantageously be provided with interconnecting features 205 in order to create a stronger and stiffer support structure. Further, mounting features 206 may be provided to allow secure connection between the support panels and the module foundation. Access cut-outs 207 may optionally be supplied in the support panels in order to facilitate maintenance and inspection of the valves. The module may also be advantageously provided with a top cover 208 which provides weather protection to the valves. This cover may be provided with valve actuation port 209 to permit installation of the required valve actuation means, whether they are pneumatic or electrical lines. Alternatively, the valve control apparatus may be advantageously located inside the valve cover 208, protected from the weather. In this case, only a main electrical and/or pneumatic supply line would be required.

Figure 5B:
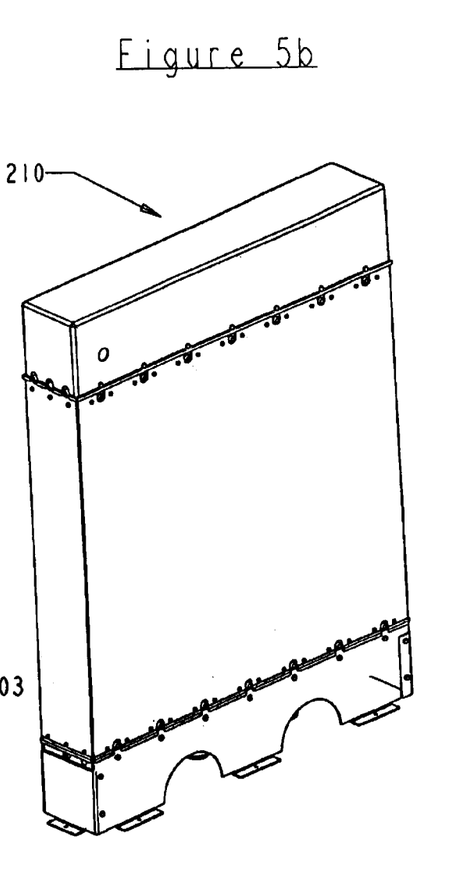
FIG. 5b shows an assembled view of the second embodiment of the PSA apparatus of the present invention.

FIG. 5b shows an assembled view of the second embodiment of the PSA apparatus 210. It is readily apparent that if the structural panels of the present invention are applied on all sides of the module, they provide a substantial degree of protection against accidental damage to the adsorbent chambers. Such damage can easily occur during shipping and installation. The valves are also well-protected. It is, therefore, apparent that it may be advantageous in some situations to combine the panels of the second embodiment with the tie bolts of the first embodiment. A prime example being the case where local pressure vessel laws do not allow the structural panels of the present invention, but permit the tie bolts. Further, temporary panels whose only function is protection during shipment may be provided which attach using means similar to those used for the structural panels. For special applications where ease of access to the valves or adsorbent chambers is required, the PSA apparatus may be provided with panels on only two or three sides provided that the structural strength of the remaining panels is suitably increased.

The panels of the PSA apparatus of the present invention advantageously reduce the complexity of assembly. They also facilitate a reduction in weight, as they reduce localized stresses associated with the tie bolts. These advantages are combined with improved shipping and handling durability, weather protection, and increased aesthetics compared to prior art methods.

Figure 6:
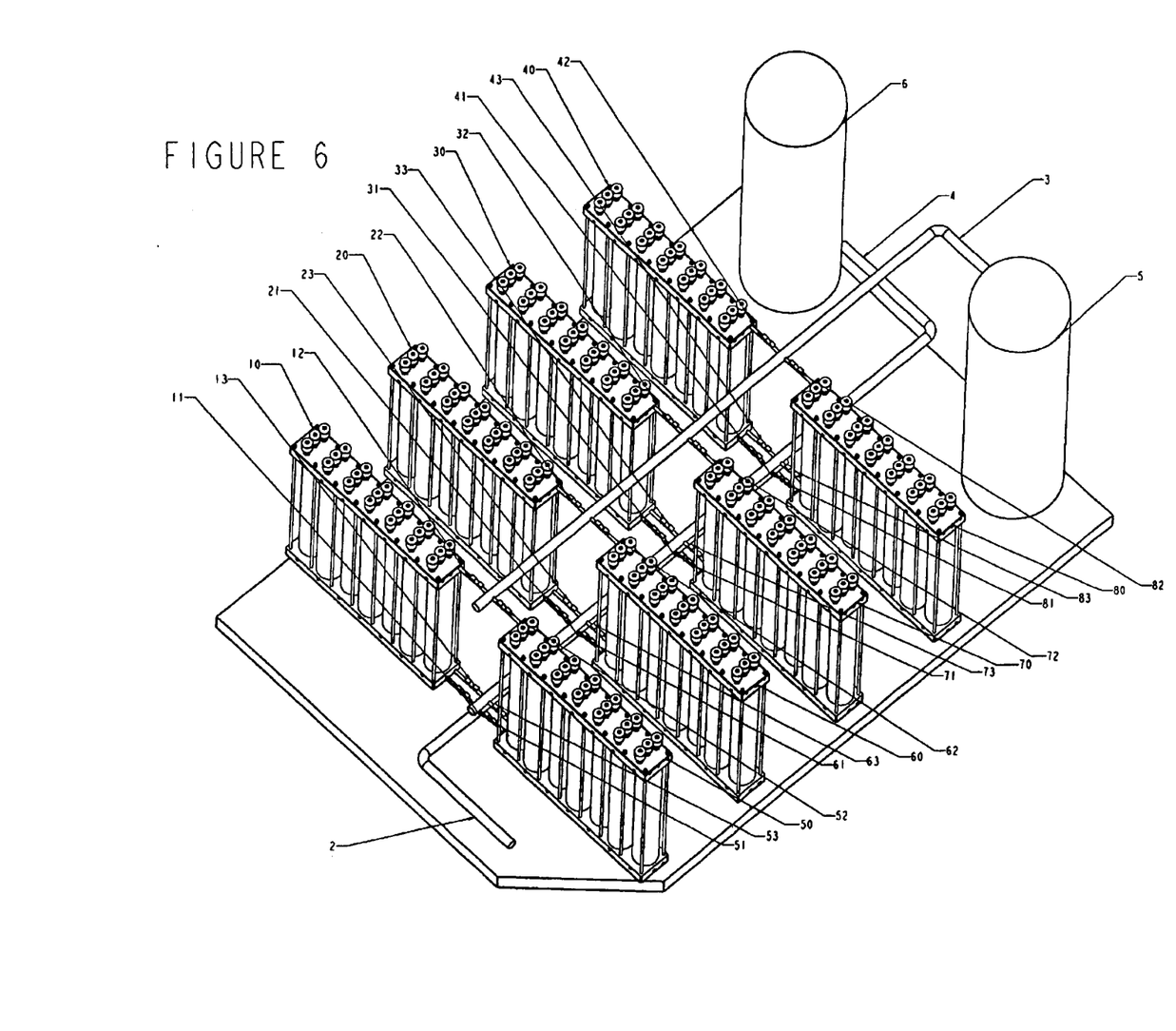
FIG. 6 shows a PSA system of the present invention implemented using the first embodiment of the PSA apparatus of the present invention.

FIG. 6 is a perspective view of the PSA system of the present invention implemented using the preferred PSA apparatus of the present invention. The elements described in FIG. 1 are indicated by their numbers in FIG. 6. The site footprint of the PSA system may be reduced significantly if no space is provided between the modules for maintenance access. Using the preferred apparatus, this may be accomplished as all maintenance tasks may be executed with access only to the top and bottom of the modules. The physical layout of the modules is not limiting, and any mechanical layout which accomplishes the fluid interconnections of the present invention will yield the special advantages of the present invention.

The present invention provides numerous advantages. For example, the present invention provides a pressure swing adsorption apparatus that does not require fluid connectors between adsorbent vessels. Additionally, the present invention provides a pressure swing adsorption apparatus that does not require welding for construction. The present invention also provides a pressure swing adsorption apparatus that has minimal empty volume. Furthermore, the present invention provides a pressure swing adsorption apparatus that does not require structural support for the adsorbent vessels. While these structural advantages may be useful in certain circumstances, such structural features are not required by the present invention.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A pressure swing adsorption (PSA) system comprising:
   a first group of PSA modules including a plurality of first PSA modules,
   a second group of PSA modules including a plurality of second PSA modules,
   a feed gas manifold connected to said first PSA modules and said second PSA modules;
   a product manifold connected to said first PSA modules and said second PSA modules;
   a waste manifold connected to said first PSA modules and said second PSA modules,
   wherein each first PSA module operates on a first PSA cycle in synchronization with the other first PSA modules,
   wherein each second PSA module operates on a second PSA cycle in synchronization with the other second PSA modules, and
   wherein said first PSA cycle is offset from said second PSA cycle.

2. The PSA system according to claim 1, wherein said first PSA cycle is one hundred and eighty degrees out of phase from said second PSA cycle.

3. The PSA system according to claim 1, further comprising a third group of PSA modules including a plurality of third PSA modules, and a fourth group of PSA modules including a plurality of fourth PSA modules, wherein:
   said feed gas manifold is connected to said third PSA modules and said fourth PSA modules;
   said product manifold is connected to said third PSA modules and said fourth PSA modules;
   said waste manifold is connected to said third PSA modules and said fourth PSA modules;
   each third PSA module operates on a third PSA cycle in synchronization with the other third PSA modules;
   each fourth PSA module operates on a fourth PSA cycle in synchronization with the other fourth PSA modules; and
   wherein said first PSA cycle, said second PSA cycle, said third PSA cycle, and said fourth PSA cycle are offset from one another.

4. The PSA system according to claim 3, wherein said first PSA cycle, said second PSA cycle, said third PSA cycle, and said fourth PSA cycle are each operated at ninety degrees out of phase.

5. The PSA system according to claim 1, wherein said first group of PSA modules includes four PSA modules, and wherein said second group of PSA modules includes four PSA modules.

6. The PSA system according to claim 1, wherein each of said first PSA modules include seven adsorbent chambers operated utilizing three pressure equalizations during said first PSA cycle.

7. The PSA system according to claim 1, wherein said first group of PSA modules includes a first predetermined number of first PSA modules and said second group of PSA modules includes a second predetermined number of second PSA modules, and wherein said first predetermined number equals said second predetermined number.

8. The PSA system according to claim 1, further comprising:
   a product surge tank connected to said product manifold; and
   a waste surge tank connected to said waste manifold.

9. The PSA system according to claim 1, wherein said first PSA modules each comprise a plurality of PSA adsorbent chambers.

10. The PSA system according to claim 1, wherein each first PSA module includes a first predetermined number of first PSA adsorbent chambers and each second PSA module includes a second predetermined number of second PSA adsorbent chambers, and wherein said first predetermined number equals said second predetermined number.

11. The PSA system according to claim 1, wherein said plurality of first PSA modules and said plurality of second PSA modules each comprise:
   a plurality of pressurized adsorbent chambers;
   an inlet manifold provided with a feed channel connected to said feed manifold and each pressurized adsorbent chamber of said plurality of pressurized adsorbent chambers, said inlet manifold being provided with a waste channel connected to said waste manifold and each pressurized adsorbent chamber of said plurality of pressurized adsorbent chambers;
   an outlet manifold provided with a product channel connected to said product manifold and each pressurized adsorbent chamber of said plurality of pressurized adsorbent chambers; and
   a rigid structure connecting said inlet manifold to said outlet manifold,
   wherein said rigid structure structurally joins said inlet manifold and said outlet manifold to said plurality of pressurized adsorbent chambers.

12. A pressure swing adsorption (PSA) module for use in a PSA system, said PSA module comprising:
   a plurality of pressurized adsorbent chambers;
   an inlet manifold provided with a feed channel connected to each pressurized adsorbent chamber of said plurality of pressurized adsorbent chambers, said inlet manifold being provided with a waste channel connected to each pressurized adsorbent chamber of said plurality of pressurized adsorbent chambers;

an outlet manifold provided with a product channel connected to each pressurized adsorbent chamber of said plurality of pressurized adsorbent chambers; and a rigid structure connecting said inlet manifold to said outlet manifold, wherein said rigid structure structurally joins said inlet manifold and said outlet manifold to said plurality of pressurized adsorbent chambers.

13. The PSA module according to claim 12, wherein said rigid structure is not in contact with fluid flowing through said PSA module.

14. The PSA module according to claim 12, wherein said rigid structure includes a plurality of tie bolts extending between said inlet manifold and said outlet manifold.

15. The PSA module according to claim 12, wherein said rigid structure includes a plurality of panels extending between said inlet manifold and said outlet manifold.

16. The PSA module according to claim 15, further comprising a cover enclosing said outlet manifold and a plurality of valves provided on said outlet manifold.

17. The PSA module according to claim 12, wherein each pressurized adsorbent chamber of said plurality of pressurized adsorbent chambers includes a first sealing boss provided between said pressurized fluid chamber and said inlet manifold and a second sealing boss provided between said pressurized fluid chamber and said outlet manifold.

18. The PSA module according to claim 17, wherein at least one pressurized adsorbent chamber of said plurality of pressurized adsorbent chambers comprises:

a retainer plate provided at one end of and extending across a flow path of said at least one pressurized adsorbent chamber;

a mesh layer provided adjacent to said retainer plate and extending across said flow path of said at least one pressurized adsorbent chamber; and an adsorbent mass provided adjacent to said mesh layer, wherein said first sealing boss has a portion that extends within said pressurized adsorbent chamber, said portion having a concave surface provided opposite said retainer plate, said concave surface and said retainer plate defining a chamber, and wherein said first sealing boss includes a flow distributor provided within said chamber.

19. The PSA module according to claim 12, wherein at least one pressurized adsorbent chamber of said plurality of pressurized adsorbent chambers comprises:

a first retainer plate provided at one end of and extending across a flow path of said at least one pressurized adsorbent chamber;

a first mesh layer provided adjacent to said first retainer plate and extending across said flow path of said at least one pressurized adsorbent chamber;

a second retainer plate provided at an opposite end of and extending across said flow path of said at least one pressurized adsorbent chamber;

a second mesh layer provided adjacent to said second retainer plate and extending across said flow path of said at least one pressurized adsorbent chamber; and an adsorbent mass provided between said first mesh layer and said second mesh layer.

20. The PSA module according to claim 19, wherein said at least one pressurized adsorbent chamber further comprises an elastic layer provided between said first retainer plate and said adsorbent mass, wherein said elastic layer is held in compression between said first retainer plate and said adsorbent mass.

21. The PSA module according to claim 20, wherein said elastic layer is a filter.

22. The PSA module according to claim 19, wherein said at least one pressurized adsorbent chamber further comprises a first radial seal ring configured to join together said first retainer plate and said first mesh layer and a second radial seal ring configured to join together said second retainer plate and said second mesh layer.

23. The PSA module according to claim 19, wherein said at least one pressurized adsorbent chamber further comprises a first snap ring configured to mount said first retainer plate and said first mesh layer and a second snap ring configured to mount said second retainer plate and said second mesh layer.

24. The PSA module according to claim 12, wherein said outlet manifold is provided with a first equalization channel connected to each pressurized adsorbent chamber of said plurality of pressurized adsorbent chambers, and wherein said outlet manifold is provided with a second equalization channel connected to each pressurized adsorbent chamber of said plurality of pressurized adsorbent chambers.

25. The PSA module according to claim 12, wherein said rigid structure is connected to at least one pressurized adsorbent chamber of said plurality of pressurized adsorbent chambers by means for connecting that does not transmit a bending moment to said at least one adsorbent chamber.

* * * * *